Jan. 13, 1931.　　　　J. L. CATO　　　　1,789,215

AILERON

Filed April 3, 1928　　　2 Sheets-Sheet 1

INVENTOR
Joseph L. Cato
by Parker & Prochnow
ATTORNEYS

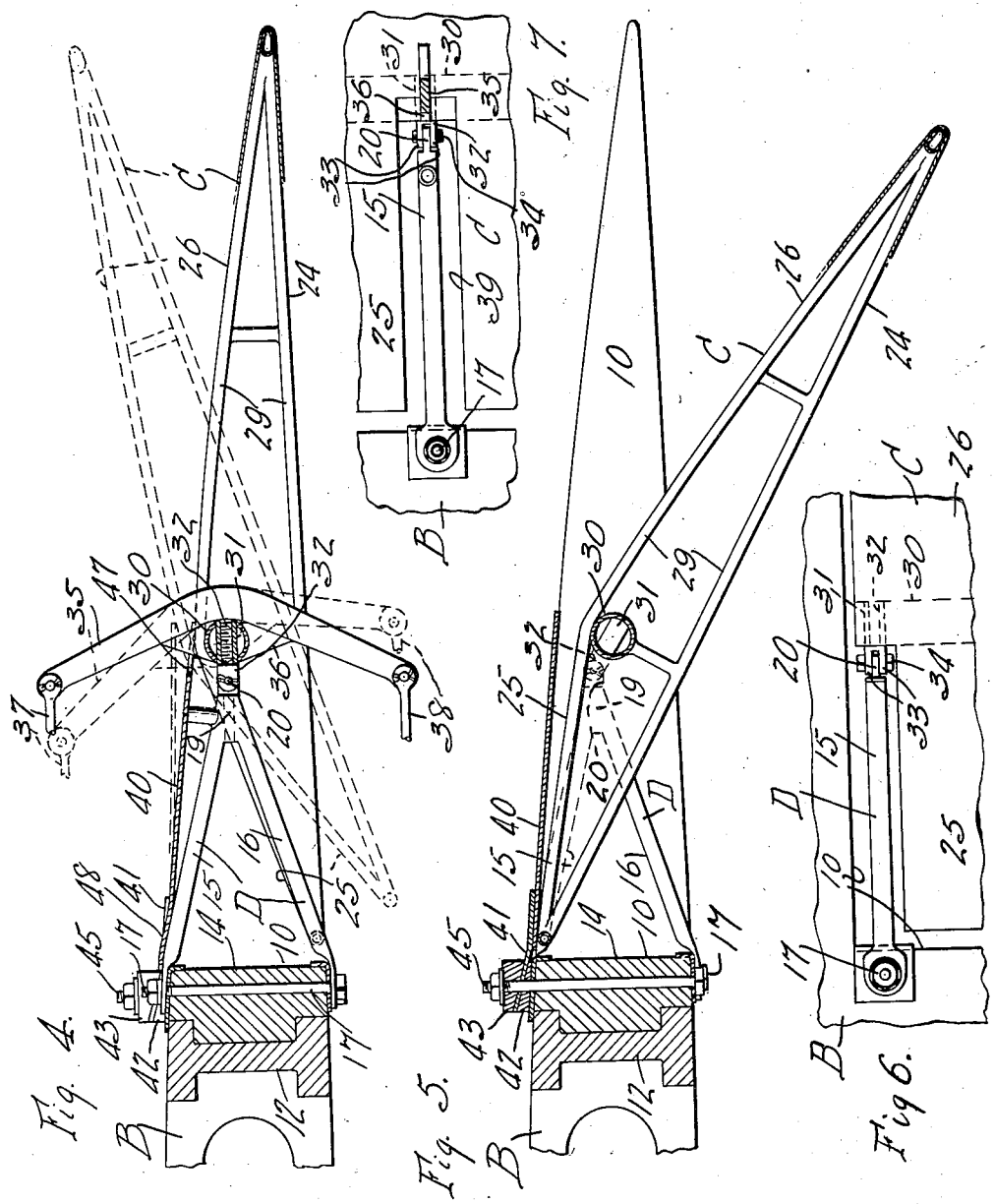

Patented Jan. 13, 1931

1,789,215

UNITED STATES PATENT OFFICE

JOSEPH L. CATO, OF BUFFALO, NEW YORK, ASSIGNOR TO G. ELIAS & BRO. INC., OF BUFFALO, NEW YORK

AILERON

Application filed April 3, 1928. Serial No. 266,901.

This invention relates to airplane and more particularly to the aileron construction of airplane wings.

Ailerons have heretofore been generally so constructed that they swing about the front ends thereof and consequently the aileron controls are usually rather difficult to operate. Attempts to construct balanced ailerons have not been successful because of eddys of air developing in the recess in the wings in which the ailerons are arranged, which increase the resistance of the wing in passing through the air and also tend to turn the airplane from its line of flight.

The objects of this invention are to provide a construction whereby balanced or partly balanced ailerons may be used, and so to construct ailerons and wings as to enable a pilot more easily to keep a plane on a straight line of flight, and also to make the controls of the ailerons easier to operate; also to provide an aileron construction by means of which better control of the airplane is obtained at slow flying speeds; also to construct a balanced aileron which is so formed that the front edge thereof does not extend above the top surface of the airfoil; also to provide means for closing portions of the recesses in the rear edges of the wings in which the ailerons are arranged to prevent a formation of eddys therein; also to yieldingly mount such means, so that such means may raise when the front end of an aileron is lowered below the lower surface of the airfoil; also to provide an aileron which is hinged above the center of the airfoil to provide a greater control surface; also to improve the construction of the ailerons in other respects hereinafter specified.

Figure 3:
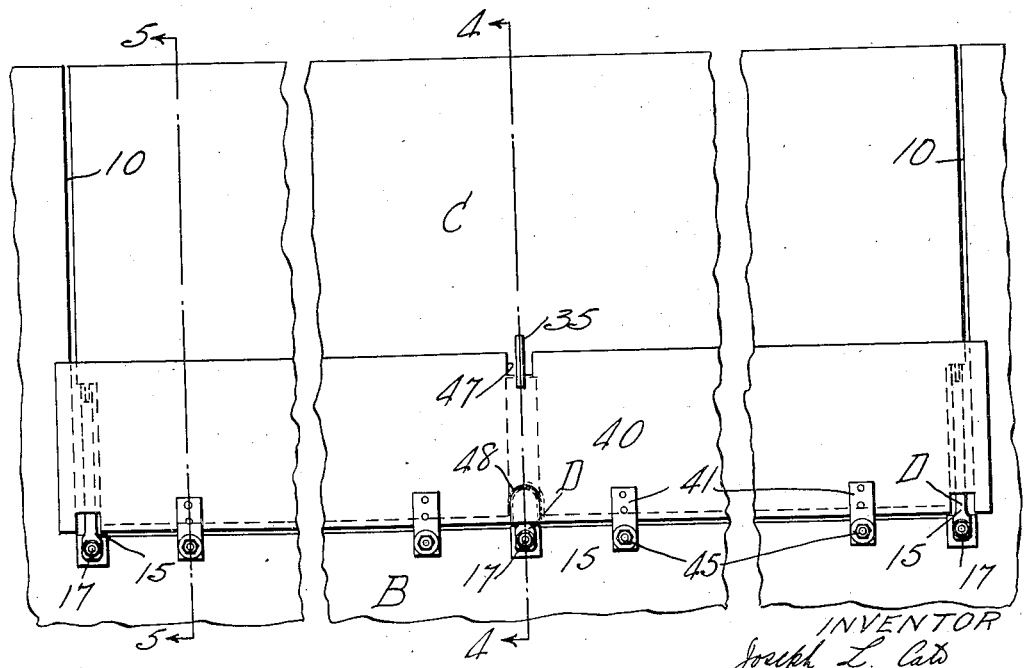
Fig. 3 is a fragmentary top plan view of an aileron and adjacent portions of the wing.

Figs. 4 and 5 are fragmentary sectional elevations on lines 4—4 and 5—5 respectively, Fig. 3, showing the aileron in different positions.

Fig. 6 is a fragmentary top plan view of the side of an aileron with the recess closing means or flap removed therefrom.

Fig. 7 is a similar top plan view of the central portion of the aileron.

Figure 1:
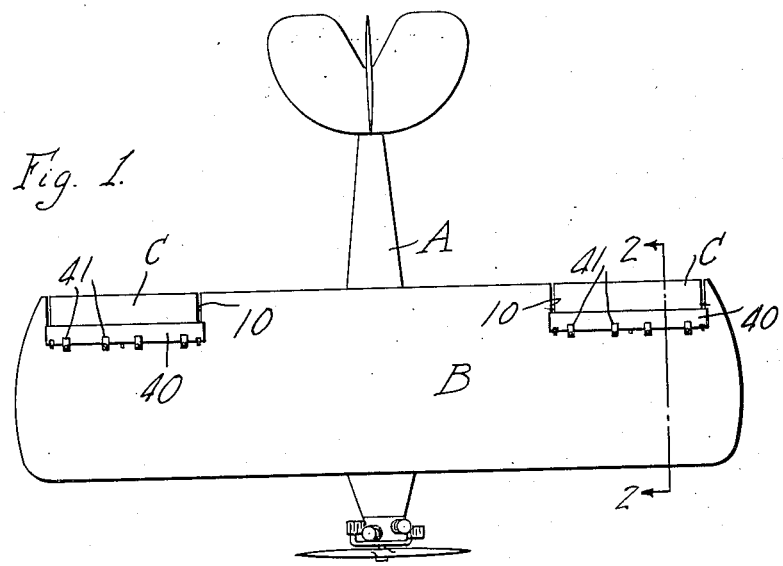
Fig. 1 is a top plan view of an airplane provided with ailerons and wing construction embodying this invention.
Figure 2:
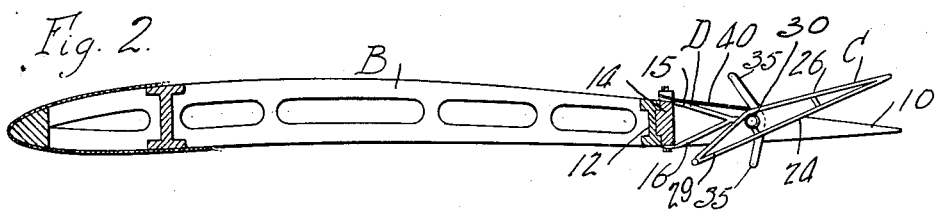
Fig. 2 is a section elevation of the airplane wing on line 2—2, Fig. 1.

Referring to Fig. 1, A represents the fuselage of an airplane and B the wing having ailerons C arranged thereon in recesses or cut-out portions 10 extending inwardly from the rear edge of the wing. The wing may be of ordinary construction such as illustrated in section in Fig. 2. The airplane and wing construction are shown for purposes of illustration only, since the aileron construction embodying my invention may be used in connection with airplanes and wings of other forms.

The wing shown is provided at a distance from the rear edge thereof with a transverse beam or structural member 12 extending transversely of the airplane from side to side of the wing and having reinforcing blocks 14 secured thereto and arranged at the front edges of the recesses 10 in the wing B. These blocks are employed in the construction illustrated for the purpose of supporting bearing brackets D for the ailerons, but other means for supporting the aileron pivots or bearings may be provided if desired.

The bearing brackets D for the ailerons include upper and lower diverging arms 15 and 16, which may be tubular in form and the front ends of which in the construction shown are flattened and secured to the upper and lower faces of the blocks 14 in any suitable manner, for example, by means of bolts 17 extending through the flattened ends of the arms and through the blocks 14. The arms 15 and 16 are secured together at 19 and the brackets are provided at their rear end with bearing lugs or projections 20 on which the ailerons C are pivoted.

In the particular construction shown, three bearing brackets are provided for each aileron, but any desired number of bearing brackets may be provided if desired.

Each of the ailerons C in the particular construction shown has a lower rear face 24 which conforms substantially in contour with the adjacent lower face of the wing B, and the upper surface of the aileron includes front and rear faces 25 and 26, which incline forwardly and rearwardly respectively, thus converging toward the lower face 24. The structure of the ailerons may be of any suitable or desired kind, those shown each including a framework 29 of tubing and having a relatively large tube or frame member 30 extending from side to side of the aileron intermediate of the front and rear edges thereof, for example, at the juncture of the front and rear top faces 25 and 26, this tube is suitably welded or otherwise connected to the framework 29 and is pivotally connected with the bearing brackets. For example, in the construction shown, the tube 30 is provided at intervals with threaded sleeves 31 secured to and extending transversely of the tube and adapted to receive correspondingly threaded studs 32 having bearing lugs 33 formed on their front ends which are spaced apart to receive between them the bearing bracket, a pivot bolt 34 extending through the lugs to form a pivotal connection between the ailerons and the bearing brackets therefor. Other means for pivotally mounting the ailerons on the airplane wing may be employed if desired.

In case more than two bearing brackets D are employed, two of the brackets are preferably arranged at the ends of each aileron as clearly shown in Fig. 6. Additional brackets may be arranged intermediate of the ends, in which case the aileron is provided with a recess 39 at the front edge portion thereof for each intermediate bracket as shown in Figs. 4 and 7. 35 represents the usual control masts of the ailerons which are rigidly secured to the framework of the aileron and if desired the mast 35 of each aileron may be secured to the tube 30 thereof, and a brace plate 36 being welded to the mast and to the tube 30.

The usual control cables or the lines 37 and 38 are secured to the upper and lower ends of the mast as shown in Fig. 4.

When an aileron of this shape is in normal flight position as shown in full lines in Fig. 4 the lower face 24 of the aileron forms substantially a continuation of the lower face of the wing and the upper face 26 of the rear portion of the aileron also forms substantially a continuation of the rear portion of the upper face of the wing, but the downwardly inclined upper face 25 of the front portion of the aileron extends below the top surface of the airfoil and therefore produces a recess or gap in the upper surface of the airfoil which would cause eddys to form therein and which would therefore increase greatly the resistance of the wing when passing through the air. In order to remedy this condition means are employed for covering the gap or recess thus formed, which means are preferably flexibly mounted so that when the aileron is in the position shown in dotted lines in Fig. 4 the air scooped up by the front tapered end of the aileron flows upwardly through the gap and thus make it possible to obtain better control of the airplane at slow flying speeds. These means for covering the gap formed above the front taper end of the aileron may be of any suitable or desired construction those shown being formed as follows:

A plate 40 is arranged to lie on the top surface of the airplane wing to cover the portion of each recess 10 which is occupied by the front forwardly tapered portion of the aileron, the plate forming substantially a continuation of the upper surface of the wing. This plate is preferably held yieldingly in its normal position in which it forms substantially a continuation of the upper surface of the wing, in any suitable or desired manner. In the construction shown each plate 40 has secured to the front edge thereof a plurality of spring plates or members 41 which may suitably be secured to a wing of the airplane.

In the particular construction shown each spring plate 41 is preferably arranged between a pair of clamping blocks 42 and 43 arranged on the upper surface of the block 14 and a bolt 45 extending through the block 14 and through suitable apertures in the blocks 42 and 43 and in the spring 41, clamps the front ends of the spring in fixed relation to the airplane wing.

When the aileron is positioned as shown in dotted lines in Fig. 4 the air which passes upwardly along the upper surface 26 of the aileron will cause the plate 40 to swing upwardly against the action of the spring plates 41 to permit this air to pass upwardly beyond the plate. Under ordinary conditions the springs yieldingly hold the plate 40 so that the edges thereof engage the top surface of the wing B. Preferably the intermediate bracket for the aileron is provided with a recessed portion 47 into which the mast 35 may enter, for example, when in the position shown in dotted lines in Fig. 4 and the plate may also be provided with an arched or bent portion 48 to clear the intermediate bearing bracket of the aileron. Other means for yieldingly mounting the plate 40 may be provided if desired.

It will be obvious that the construction described results in a balanced or partly balanced aileron in which air pressure acting on front and rear portions of the aileron will preferably balance each other, thus making the controls for the aileron much easier to operate than is the case with ailerons as heretofore constructed. Furthermore by having the aileron formed so that the front portion thereof may extend below the lower surface of the plane when the aileron is in the dotted position shown in Fig. 4, a better control is obtained at slow flying speeds.

It is also desirable to have the pivots or bearings of the ailerons located as high as practicable, so that a greater control surface on the upper surface of each aileron is made available, the pivots for this purpose in the construction shown being arranged well above the center of the airfoil. It is also desirable to have the ailerons arranged so that the front edges thereof do not pass above the upper surface of the plane, the extreme position of the aileron in this direction being shown in Fig. 5.

I claim as my invention:

1. An airplane wing having recesses in the rear portion thereof, ailerons pivoted intermediate of their lengths in said recesses and having their front portions arranged to extend below the lower surface of the wing, and plates yieldingly held over the upper front portions of said recesses to approximately conform to the upper contour of said wing and to be raised by air pressure when the front portions of the ailerons extend below the lower surface of the wing.

2. An airplane wing having recesses in the rear portion thereof, ailerons pivoted intermediate of their lengths in said recesses and having rear portions conforming in contour to adjacent portions of said wing and front portions with their upper and lower surfaces converging toward the front edges of said ailerons, said front portions being arranged to extend below the lower surface of the wing, and yielding means for covering the upper portions of said recesses at the front ends thereof, said means being arranged to yield upwardly when the front portions of said ailerons extend below the lower surface of the wing.

3. An airplane wing having recesses in the rear portion thereof, ailerons pivoted to said wing intermediate of their length and arranged in said recesses, each of said ailerons including a frame member extending substantially throughout the width of said ailerons and intermediate of the front and rear ends thereof, a frame for said aileron secured to said frame member, bearings for pivoting said aileron on said wing and cooperating with parts secured to said frame member, a mast for each aileron secured to said frame member and extending above and below the same, and control members secured to the ends of said mast.

4. An airplane wing having substantially rectangular recesses extending forwardly from the rear portions thereof, ailerons arranged in said recesses and pivoted intermediate of their front and rear ends to said wing, the front portions of said ailerons converging toward their front ends and having their front ends normally lying approximately in line with the lower face of the wing, said ailerons being pivoted to swing from their normal positions into positions in which the front ends of the ailerons are positioned immediately beneath the upper surface of the wing and to positions below the lower surface of the wing, and means yieldingly closing said recesses above the front converging portion of said ailerons and mounted to raise to permit air to pass upwardly when said ailerons are in positions in which the front edges thereof are below the lower face of the wing.

5. An airplane wing having recesses in the rear portions thereof to receive ailerons, said wing having a transverse beam extending in front of said recesses, a block secured to said wing in the front portion of each recess, an aileron in each of said recesses and having a rear portion conforming in contour to adjacent portions of said wing and a front portion which converges toward the front end of the aileron, bearing brackets secured to said blocks and extending rearwardly into said recesses, and means for pivoting said ailerons to said bearing brackets intermediate of the front and rear ends thereof to permit the front edges of said ailerons to swing below the lower surface of said wing.

6. An airplane wing having recesses in the rear portions thereof to receive ailerons, said wing having a transverse beam extending in front of said recesses, a block secured to said wing in the front portion of each recess, an aileron in each of said recesses and having a rear portion conforming in contour to adjacent portions of said wing and a front portion which converges toward the front end of the aileron, bearing brackets secured to said blocks and extending rearwardly into said recesses, and means for pivoting said ailerons to said bearing brackets intermediate of the front and rear ends thereof to permit the front edges of said ailerons to swing below the lower surface of said wing and plates yieldingly mounted on said blocks and extending rearwardly over the portions of said recesses occupied by the front converging portions of said ailerons.

7. An airplane wing having recesses in the rear portions thereof to receive ailerons, said wing having a transverse beam extending in front of said recesses, a block secured to said wing in the front portion of each recess, an aileron in each of said recesses and having a rear portion conforming in contour to adjacent portions of said wing and a front portion which converges toward the front end of the aileron, bearing brackets secured to said blocks and extending rearwardly into said recesses, and means for pivoting said ailerons to said bearing brackets intermediate of the front and rear ends thereof to permit the front edges of said ailerons to swing below the lower surface of said wing, and plates yieldingly mounted on said blocks and extending rearwardly over the portions of said recesses occupied by the front converging portions of said ailerons and stops on said wing and brackets for limiting the downward swinging of said plates.

8. An airplane wing having recesses in the rear portions thereof to receive ailerons, said wing having a transverse beam extending in front of said recesses, an aileron in each of said recesses and having a rear portion conforming in contour to adjacent portions of said wing and a front portion which converges toward the front end of the aileron, bearing brackets secured to said wing and provided with bearings near the upper edges of said recesses, cooperating bearing members on said ailerons arranged in rear of the front edges of said ailerons and permitting said ailerons to swing into positions in which the front edges thereof extend below the lower surface of said wing, means for covering the upper surfaces of the portions of the recesses occupied by the converging front portions of said ailerons, said means being arranged to be deflected upwardly by air passing along the upper surface of the front portions of said ailerons.

JOSEPH L. CATO.